(12) United States Patent
Meyer

(10) Patent No.: US 8,177,167 B2
(45) Date of Patent: May 15, 2012

(54) CENTRAL SECTION OF AIRCRAFT WITH VENTRAL OR BELLY FAIRING CAPABLE OF MOVEMENT

(75) Inventor: Cedric Meyer, Fonsorbes (FR)

(73) Assignee: Airbus Operations SAS, Toulouse (FR)

( * ) Notice: Subject to any disclaimer, the term of this patent is extended or adjusted under 35 U.S.C. 154(b) by 539 days.

(21) Appl. No.: 12/569,209

(22) Filed: Sep. 29, 2009

(65) Prior Publication Data

US 2010/0170987 A1 Jul. 8, 2010

(30) Foreign Application Priority Data

Sep. 30, 2008 (FR) ...................................... 08 56603

(51) Int. Cl.
*B64C 1/00* (2006.01)
(52) U.S. Cl. ........................................ 244/119; 244/120
(58) Field of Classification Search .................. 244/119, 244/120, 117 R, 130, 131
See application file for complete search history.

(56) References Cited

U.S. PATENT DOCUMENTS

| | | | | |
|---|---|---|---|---|
| 5,542,626 A | * | 8/1996 | Beuck et al. | 244/107 |
| 6,581,877 B2 | * | 6/2003 | Pauly | 244/131 |
| 8,056,850 B2 | * | 11/2011 | Lin et al. | 244/1 N |
| 8,066,221 B2 | * | 11/2011 | Rouyre | 244/119 |
| 2006/0065784 A1 | * | 3/2006 | Rouyre | 244/119 |
| 2008/0099610 A1 | * | 5/2008 | Jimenez Del Lago et al. | 244/119 |
| 2008/0283665 A1 | * | 11/2008 | Rouyre | 244/119 |
| 2009/0184200 A1 | * | 7/2009 | Lin et al. | 244/1 N |
| 2010/0133382 A1 | * | 6/2010 | Pahl | 244/120 |

FOREIGN PATENT DOCUMENTS

| | | | |
|---|---|---|---|
| EP | 1604900 A | 12/2005 | |
| FR | 2836890 A | 9/2003 | |
| FR | 2894225 A | 6/2007 | |

OTHER PUBLICATIONS

French Search Report dated May 26, 2009.

* cited by examiner

*Primary Examiner* — Christopher P Ellis

(74) *Attorney, Agent, or Firm* — Perman & Green, LLP

(57) ABSTRACT

An aircraft center section includes a center part of an aircraft fuselage, a wing section, a center wing box installed at least partly in the fuselage and providing a junction between the wing section and the fuselage, and a ventral fairing partly enveloping the fuselage and the wing section, with the ventral fairing being attached directly to the wing section and to the fuselage by means of structural elements that can make the ventral fairing a working fairing.

10 Claims, 6 Drawing Sheets

CENTRAL SECTION OF AIRCRAFT WITH VENTRAL OR BELLY FAIRING CAPABLE OF MOVEMENT

This application claims priority to French Application No. 08 56603 filed Sep. 30, 2008, hereby incorporated by reference in its entirety.

BACKGROUND

The disclosed embodiments concern the center section of an aircraft equipped with a working ventral fairing. This ventral fairing is an integral part of the primary structure of the central section, thus making it possible to transfer flexural forces from one part of the structure of the central section to another part of said structure.

The disclosed embodiments have applications in the field of aeronautics and, in particular, in the field of producing and assembling the ventral fairing of an aircraft.

An aircraft includes a body, called the fuselage, and wings, forming the wing structure of the aircraft. This wing structure is mounted on the fuselage and attached by means of a central wing box whose main function is to provide a junction between the two opposite wings of the aircraft. The center wing box, located at least partly in the aircraft fuselage, repeats the internal architecture of the wing structure and extends that architecture inside the fuselage to produce all of the structural junctions with the fuselage.

An aircraft has several sections:
- the nose cone, which contains the cockpit,
- the front section of the aircraft, which is the part between the nose cone and the wing section,
- the tail section of the aircraft, which is the back part of the aircraft after the wing section, and
- the center section of the aircraft, which is the part of the aircraft located next to the wings.

An example of an aircraft with its different sections is shown in FIG. 1. In this figure, the nose cone is marked 10, the front section 11, the center section 12 and the tail section 13.

As can be seen in FIG. 1, the center section of the aircraft includes the wing section 14, the part 15 of the fuselage located next to the wing section (between the two wings) and the center wing box, not visible in FIG. 1. This center section 12 also includes a ventral fairing 20, also called the belly or, in English, the belly fairing.

The ventral fairing 20 of an aircraft is an aerodynamic element enveloping the landing gear system, when said gear is pulled up, and the different operating systems of the aircraft (air-conditioning system, hydraulic tanks, etc.) The ventral fairing is a cowl that serves to close the site of the landing gear while ensuring aerodynamic continuity under the fuselage. To ensure this aerodynamic continuity, the ventral fairing generally has an elongated, profiled shape, as shown in FIG. 1.

An example of a ventral fairing is also shown in FIGS. 2 and 3. FIG. 2 shows a profile view of the ventral fairing 20. FIG. 3 shows a schematic view of the central fairing 20 in the center 15 of the fuselage. These figures show that the ventral fairing 20 is partially placed around the center part 15 of the fuselage, under the aircraft. Side openings 21 in the ventral fairing position said fairing around the wing section. The two wings forming the wing section are each attached, via the openings 21 in the ventral fairing 20, to the center wing box. The ventral fairing 20 is therefore an interface between the wing section and the fuselage of the aircraft.

Traditionally, the ventral fairing is an element independent of the fuselage, attached to the fuselage and the wing section. For this, the ventral fairing has a special structure: it is comprised of an envelope 22 that makes it possible to ensure the aerodynamic continuity of the aircraft and a substructure 23 that maintains the shape of the envelope 22.

The envelope 22 is made of panels generally composed of a fiber-reinforced composite material. This envelope is attached to the substructure 23. The substructure 23 absorbs the pressure forces exerted on the panels of the envelope and the forces created by deformation of the aircraft (flexure of the fuselage, thermal deformation, etc.). The substructure 23 of the ventral fairing is generally composed of frames, wing sections, stiffeners and metal rods, as shown in FIG. 2. It can also include some composite elements, to which are added system supports.

The panels forming the envelope of the ventral fairing, particularly when they are made of composite materials, are attached to the substructure of the fairing. They are not attached directly to the wing section or the fuselage. The consequence of this indirect attachment is the following: in flight, the aircraft is deformed due to the effect of aerodynamic forces; this deformation of the aircraft causes some play in the positioning of the panels in relation to the wing section and the fuselage. The fairing must therefore be attached to the fuselage in such a way as to prevent any interference between the fairing and the fuselage that would produce erosion of the fuselage.

To do so, joints are placed between the ventral fairing and the fuselage to absorb the play between these elements. These joints provide, on one hand, aerodynamic continuity on the fuselage and, on the other hand, a seal between the fairing and the wing section, as well as between the fairing and the fuselage to prevent the flow of water. These sealing joints between the skin of the fuselage and the envelope of the fairing also serve to prevent vibration. More precisely, a ventral fairing joint must perform the following functions:
- it must ensure the aerodynamic continuity of the fairing/fuselage and fairing/wing section
- it must allow relative movement of the fairing panels in relation to the fuselage or the wing section, and/or
- it must provide a seal between the fairing and the wing section and between the fairing and the fuselage.

However, a ventral fairing joint is subjected to various stresses: its rigidity must be adapted to its function; it should not vibrate and must prevent the vibration of panels in the fairing; it must reduce noise by preventing air from passing through the openings between the structural parts; it must resist attacks from the outside, such as UV rays, air, temperature, ice, erosion due to outside air containing sand particles, etc.; it must also resist attacks from the inside, for example from fuel and hydraulic fluids; it should not damage the aircraft, particularly the panels and the fuselage covering.

To do this, there are traditionally several joint shapes. Examples of joints for the ventral fairing are shown in FIG. 4. The type of joint used basically depends on its function. For example, a flat joint 4A can absorb play and provide aerodynamic continuity; a single-lip seal joint 4B is generally used for seals between fairing and fuselage panels and between wing and fairing panels, when there are no large depressions; a double-lip seal joint 4C is used in place of a lip seal when there are large depressions, for example on the upper surface of the wing; a round, hollow seal is used to provide a good seal by crushing the joint. In some cases, several joints can be combined to perform several functions. An example of a round, hollow joint combined with a single-lip seal joint is shown marked 4D in FIG. 4.

It is therefore understood that the fact that the ventral fairing is an independent part mounted on the fuselage of the aircraft, causes problems with play, friction, wear, relative deformation, etc.

There is also a recurrent problem in the field of aeronautics for aeronautic manufacturers, which is weight gain. In effect, aeronautic manufacturers are constantly trying to reduce the weight of the aircraft, particularly by reducing the amount of material necessary to fabricate the structural elements of the aircraft.

SUMMARY

The disclosed embodiments are aimed at fixing the drawbacks in the techniques described previously. To this end, the disclosed embodiments propose a working ventral fairing, i.e., a ventral fairing attached directly to the fuselage and the wing section of the aircraft so as to transmit structural forces from the wing section to the fuselage and from the nose of the fuselage to the tail of the fuselage.

Such a working ventral fairing makes it possible to eliminate problems associated with mounted parts, while making it possible to lighten the structure by integrating aerodynamic and structural functions, and hence save weight. The ventral fairing in the disclosed embodiments becomes an integral part of the junction between the fuselage and the wing section, which eliminates the problems of play, friction, etc. In addition, since the ventral fairing in the disclosed embodiments transfers some of the structural forces, the traditional structural elements can be lightened, since they transfer fewer structural forces.

More specifically, the disclosed embodiments concern the center section of an aircraft having:
- a center part of an aircraft fuselage,
- a wing section
- a center wing-section box installed at least partly in the fuselage to provide a junction between the wing section and the fuselage, and
- a ventral fairing partly enveloping the fuselage and the wing section,
- characterized by the fact that the ventral fairing is directly attached to the wing section and to the fuselage by means of structural elements that can make said ventral fairing working.

This center of the aircraft section can also include one or more of the following features:
- the structural elements constitute, at least in part, a substructure of the ventral fairing; this substructure is covered with an envelope,
- the structural elements have attachment elements to attach the wing section mechanically to the fuselage, so that at least some of the flexural forces are transferred from the wing section to the fuselage,
- the structural elements have connecting elements to attach the ventral fairing mechanically to the fuselage, so at least some of the flexural forces are transferred from the back "boat" of the fuselage to the front "boat" of said fuselage,
- the attachment elements are fish-plates, on one hand, on the stiffeners of the wing section and, on the other hand, on the lower frame section of the fuselage,
- the connecting elements are C-section frames attached to the frame of the fuselage,
- the connecting elements are attached to the frame of the fuselage by riveting or bolting,
- the structural elements are made of composite materials,
- the structural elements are made of titanium.

The disclosed embodiments also concern an aircraft equipped with a center aircraft section as described previously.

DETAILED DESCRIPTION

According to the disclosed embodiments, the ventral fairing is made to be working, i.e., in such a way as to permit the transfer of structural forces between different elements of the center section of the aircraft. In the disclosed embodiments, the ventral fairing is not just a cowl ensuring aircraft aerodynamics; it is also a structural element that ensures the transfer of some of the structural forces in the wing section to the fuselage, and from the back of the fuselage to the front. As explained above, this integration of the function of transferring forces in the ventral fairing makes it possible both to eliminate problems of play associated with mounted parts and to reduce the weight of the aircraft.

According to the disclosed embodiments, the ventral fairing is a primary structure of the aircraft, in the same way as the fuselage panels and the center wing box. For that, the ventral fairing in the disclosed embodiments includes:
- an envelope, preferably made of composite material, for example a composite material reinforced with fibers in the form of carbon fibers to offer a good weight breakdown; it can be manufactured by drape molding, for example, on a female mold; and
- a substructure, which can be metal, but which is preferably a composite material made by injection or infusion of resin, for example by a low-pressure injection process, called RTM (Resin Transfer Molding), in order to obtain a better weight breakdown.

Figure 1:
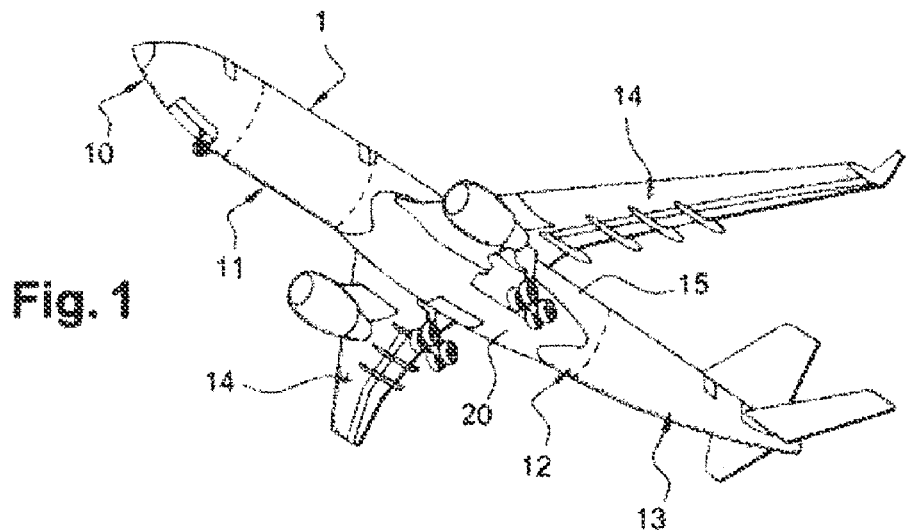
FIG. 1, already described, shows an example of an aircraft equipped with a ventral fairing.
Figure 2:
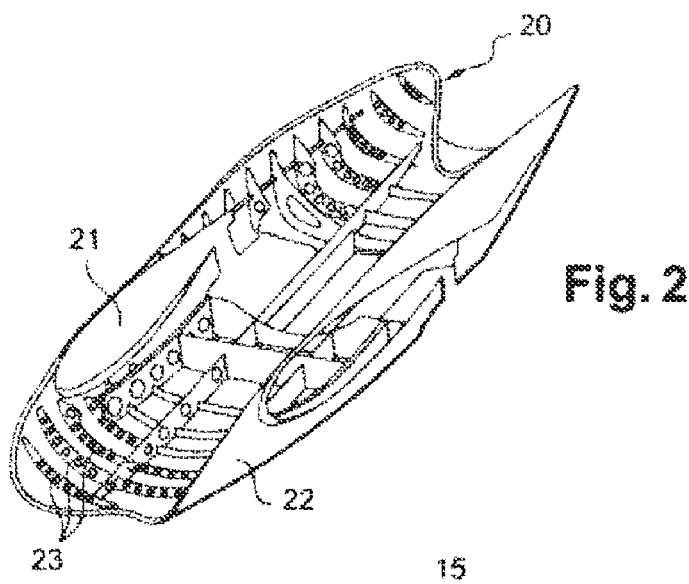
FIGS. 2 and 3 show examples of ventral fairings.
Figure 3:
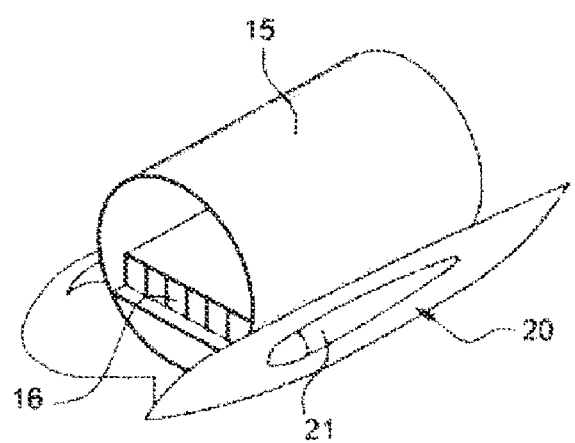
Figure 4:
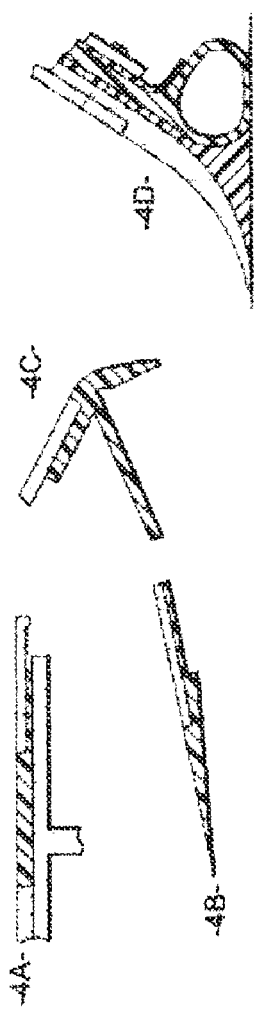
FIG. 4 shows several examples of joints traditionally used in the junction between a ventral fairing and an aircraft fuselage.
Figure 5:
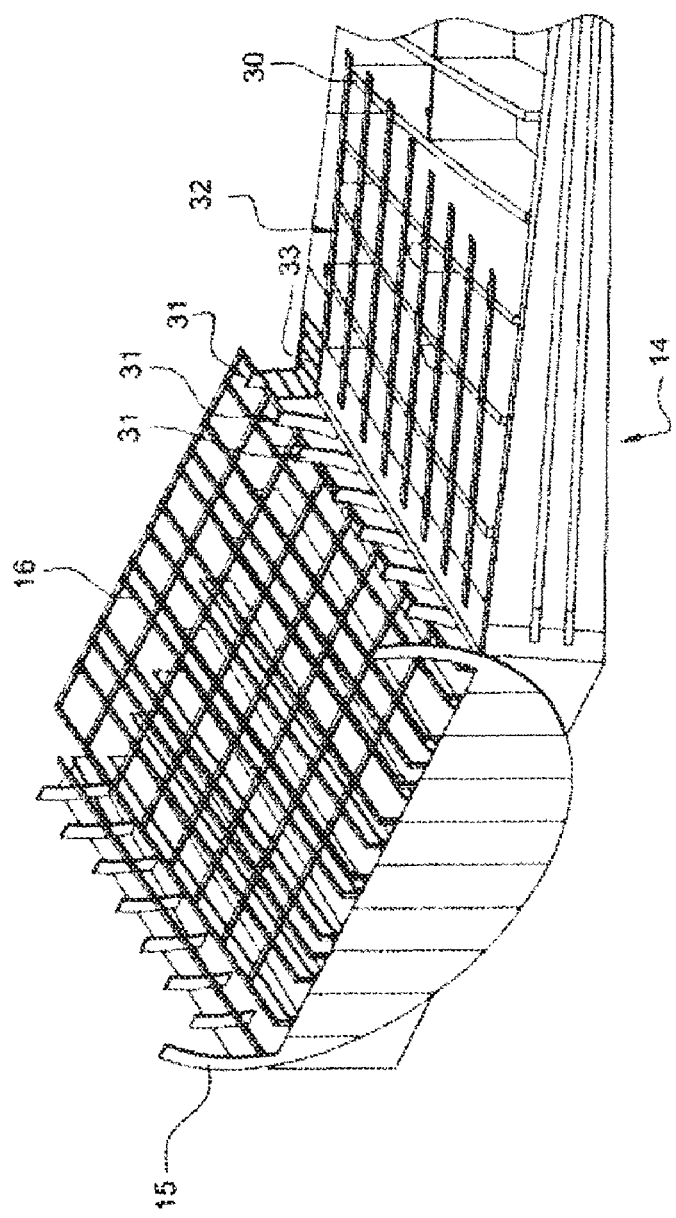
FIG. 5 shows a cross section of one part of the center section in the disclosed embodiment.

In most aircraft, the junction between the wing section and the fuselage is made by means of the center wing box. The structural forces are thus transferred from the wing section to the center box, then from the center box to the fuselage. FIG. 5 shows a cross section of part of a center section of the aircraft in the disclosed embodiments, with a junction of the wing section on the fuselage. This FIG. 5 shows the center wing box 16 and the wing box 30 of a wing in the wing section. FIG. 5 also shows a part 15 of the fuselage. The fuselage includes a plurality of frames of which only the feet 31 are seen, for purposes of simplification. These frame feet 31 are the parts of the frames of the fuselage on which are mounted the stiffeners 32 of the wing section. Each stiffener in the wing section is attached to a frame lower section by means of junction elements 33, described in greater detail below. Thus, each junction element 33 joins a stiffener to a lower frame section 31 of the fuselage.

Figure 6:
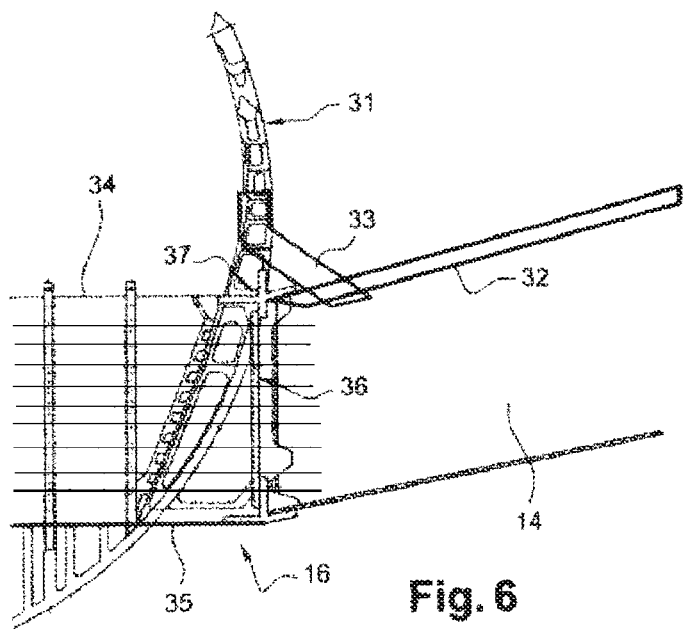
FIG. 6 shows a schematic front view of one part of the center section of the aircraft in the disclosed embodiment.

FIG. 6 is a schematic front view of part of the center section in FIG. 5. In particular, this FIG. 6 shows a wing 14 mounted on the center wing box 16. The center wing box 16 includes an upper surface panel 34 and a lower surface panel 35, parallel to one another. The upper and lower surface panels serve to absorb the lift forces of the aircraft. More precisely, the upper surface panel 34 absorbs mainly the forces of compression exerted on the wing section and brought to the fuselage by said wing section, and the lower surface panel 35 absorbs mainly the traction forces exerted by the wing section on the fuselage.

FIG. 6 shows the vertical panel 36 connecting the upper 34 and lower 35 surface panels. This vertical panel 36, called a rib 1, forms an interface between the center box 16 and the wing structure 14. FIG. 6 also shows a structural attachment piece 37 installed between the upper surface section 34 and the wing 14 called a cross.

Figures 7A, 7B:
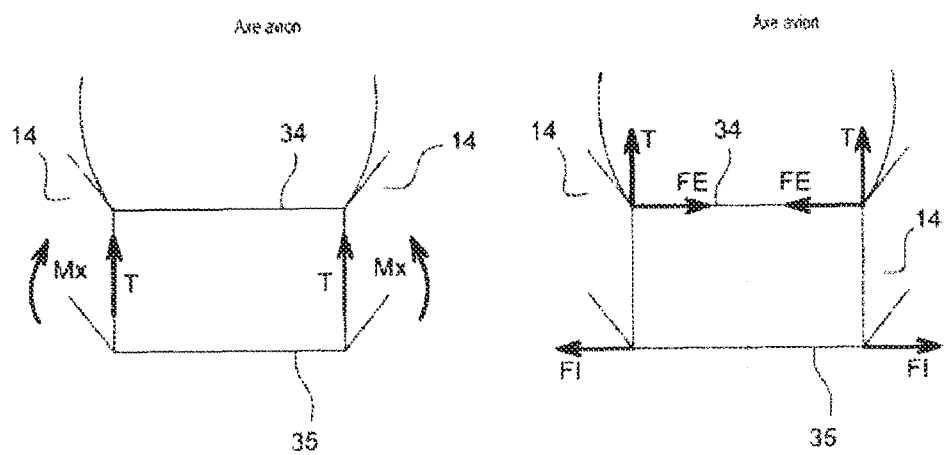
FIGS. 7A and 7B show schematically the transfers of lateral forces into the center section of an aircraft.

FIGS. 7A and 7B show symbolically, in simple lines, the structural elements in FIG. 6, through which the forces are transferred. In flight, the wing section flexes creating a flexing torque Mx, also called bending stress. This flexing torque Mx is translated into different flows of force shown schematically in FIG. 7B. It is translated by force flows into lateral compression FE and force flows into traction FI. The traction forces FI are induced by the wing section in relation to the center box, on the lower frame section 35; the lateral compressive forces are induced, by the wing section in relation to the center box, on the upper frame section 34.

FIGS. 7A and 7B also show shearing forces T. These shearing forces T are distilled, in the fuselage, via the frame and the cross. The shearing forces are integrally introduced into the fuselage via the rib 1.

In the disclosed embodiments, the ventral fairing is made working, which makes it possible to reduce the shearing forces T and the compressive forces FE, since some of these forces are transferred from the wing section to the fuselage via the ventral fairing and the frame of the fuselage. The ventral fairing is made working by means of junction elements, or structural elements, such as fish-plates. An example of such a fish-plate is shown schematically in FIG. 6 and reference 33. This fish-plate 33 connects a lower frame structure 31 of the fuselage to a wing stiffener 32. A junction element, identical to the junction element 33 shown in FIG. 6, is mounted between each stiffener 32 and each lower frame structure 31.

These junction elements 33 combined with the frame and other structural elements, form the substructure of the working ventral fairing in the disclosed embodiments.

Figure 8A:
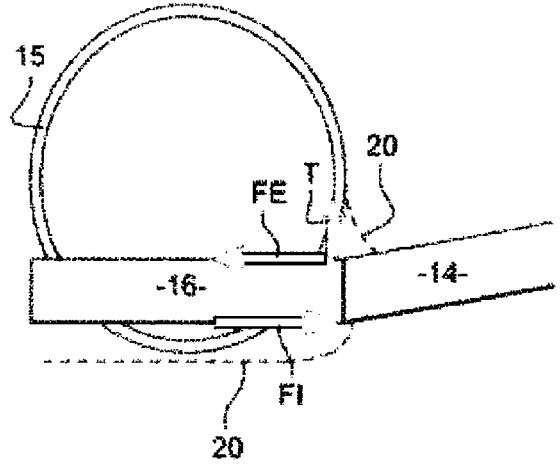
FIGS. 8A and 8B show the transfers of lateral forces into a center section equipped with a traditional fairing and a working fairing, respectively.
Figure 8B:
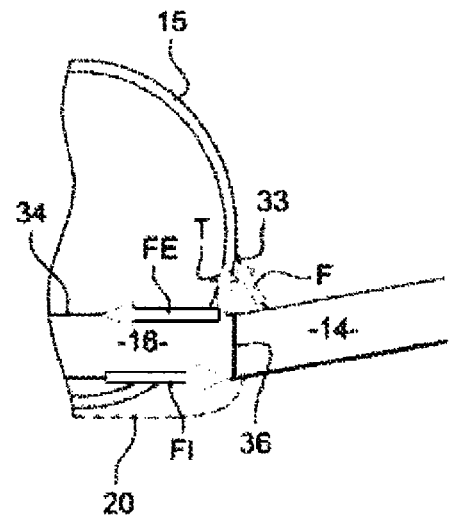

FIGS. 8A and 8B show schematically a transfer of forces, respectively, in the case of a traditional ventral fairing and in the case of a working ventral fairing. Comparing these FIGS. 8A and 8B shows that the compressive force FE, in FIG. 8B, is less than the compressive force FE in FIG. 8A. Indeed, in the case of the working ventral fairing, some of the compressive force FE is transmitted directly from the wing section to the frame of the fuselage. This part of the compressive force FE is therefore not absorbed by the upper surface panel 34. It follows that the upper surface panel 34 can be reduced, in size and thus in weight, compared to a traditional upper surface panel since it transfers a lower force. The same is true of the rib 1 36, which receives a lower compressive force and which can consequently be reduced in size and weight.

Thus, the mechanical connection between the fuselage and the wing section makes it possible to transfer some of the forces, via each of the wing stiffeners and the ventral fairing, directly to the frame of the fuselage, thus relieving the cross, in addition to the rib 1 and the upper surface panel.

As explained earlier, the ventral fairing in the disclosed embodiments has structural elements called junction elements 33. These junction elements can be fish-plates, for example. These fish-plates constitute part of the substructure of the ventral fairing on which is placed the covering or envelope. These fish-plates can be made, for example, of titanium or preferably of a composite material. Fish-plates made of composite material can be manufactured by injection or infusion molding of resin, for example according to the RTM process. They have the advantage of having no sensitivity in fatigue, contrary to titanium.

It was just explained how the working ventral fairing in the disclosed embodiments makes it possible to transfer compressive forces from the wing section to the center box. It also makes it possible to transfer compressive forces from the back of the fuselage to the front. In flight, aerodynamic currents create lift on the wing section, which flexes upward. This lift is opposed to the weight of the aircraft, which causes flexure of the fuselage. This flexure of the fuselage is translated into compressive forces between the back and the front of the aircraft fuselage.

In most aircraft, a ventral beam is installed in the fuselage, under the center box 16 to allow this transmission of compressive forces. In effect, because of the landing gear housing, the structure of the aircraft fuselage is interrupted. The longitudinal compressive forces at the gear housings cannot therefore be transmitted from the back of the fuselage to the front. To ensure this transmission of longitudinal forces, a beam is generally installed under the center wing box, across the gear housings, to mechanically connect the back of the fuselage and the front.

Figure 9:
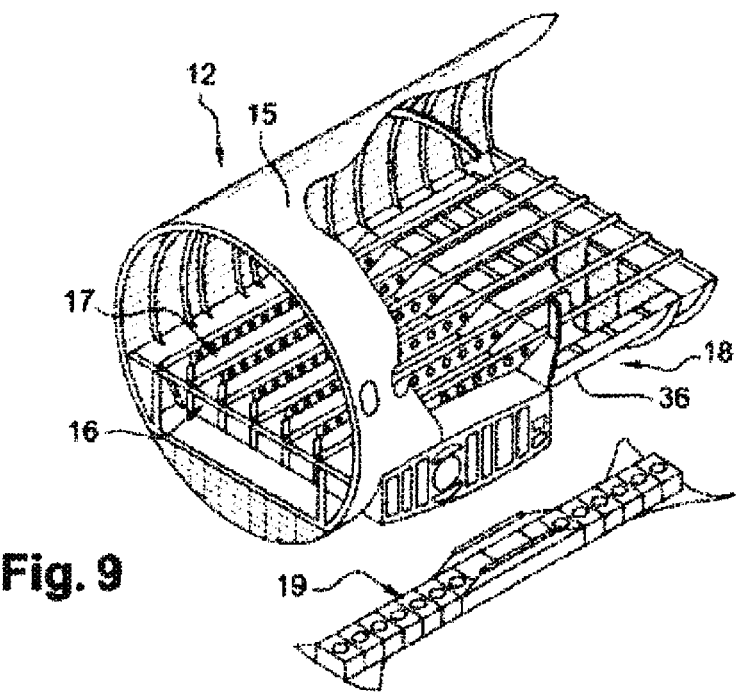
FIG. 9 shows an exploded view of a center section of an aircraft equipped with a ventral beam.

FIG. 9 shows an exploded view of part of the center section equipped with a ventral beam. This FIG. 9 shows the part 15 of the center section of the fuselage, with the longitudinal floor structure 17, the center wing box 16, the gear housing 18 and the ventral beam 19. This ventral beam 19 goes across the fuselage at the gear housing 18 to remedy the interruption of the structure at that gear housing. The ventral beam 19 is attached to the center wing box 16 to reduce its length and thus ensure support that can make it more stable. This ventral beam 19 connects the front boat and the back boat of the aircraft. Let us remember that the front boat corresponds to the lower fuselage panels (facing the ground) of the front section of the aircraft, and the back boat corresponds to the lower fuselage panels of the back section of the aircraft. The ventral beam 19 thus connects the back boat and the front boat to transmit the longitudinal compressive forces between the rear structure of the aircraft and the front structure of said aircraft.

Figure 10:
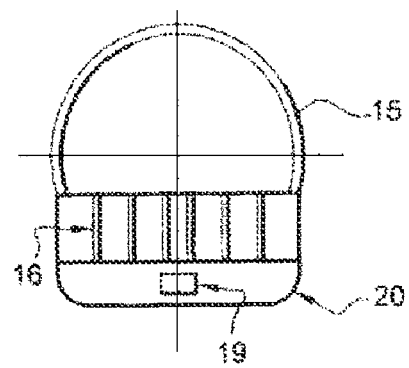
FIG. 10 shows a cross section of the center section of the aircraft in FIG. 9.

FIG. 10 shows a schematic cross section of the center section in FIG. 9. This FIG. 10 shows the fuselage 15, the center wing box 16, the ventral beam 19 and the ventral fairing 20. In the disclosed embodiments, since the ventral fairing 20 is working, it transfers part of the compressive forces into the length of the aircraft between the back of the aircraft and the front. In other words, the ventral fairing 20 in the disclosed embodiments makes it possible to transfer some of the longitudinal compressive forces from the back boat of the aircraft to the front boat, relieving the forces that go into the ventral beam 19. Since the ventral beam 19 has less compressive force to transfer, it can be reduced in size and hence in weight, which generally saves weight for the aircraft.

Figure 11A:
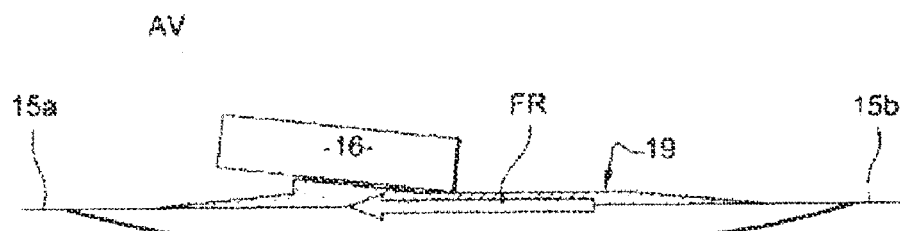
FIGS. 11A and 11B show schematically the transfers of longitudinal forces into the center section of an aircraft equipped with a traditional fairing and a working fairing, respectively.
Figure 11B:
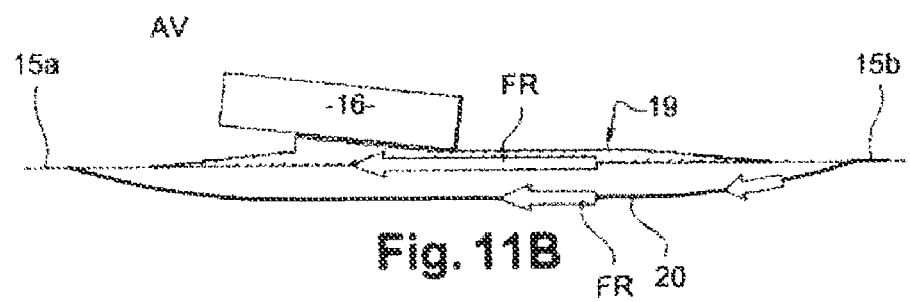

FIGS. 11A and 11B are schematic views showing the transfer of longitudinal compressive forces from the back boat of the aircraft to the front boat, respectively, in the case of a traditional ventral fairing and in the case of the working ventral fairing. By comparing these two figures, one can see in FIG. 11A that all the compressive force FR passes from the back boat panels to the front boat panels via the ventral beam 19. On the contrary, in FIG. 11B, corresponding to the disclosed embodiments, some of the compressive forces FR pass through the ventral fairing 20, thus lightening the transfer of forces through the ventral beam 19.

Figure 13:
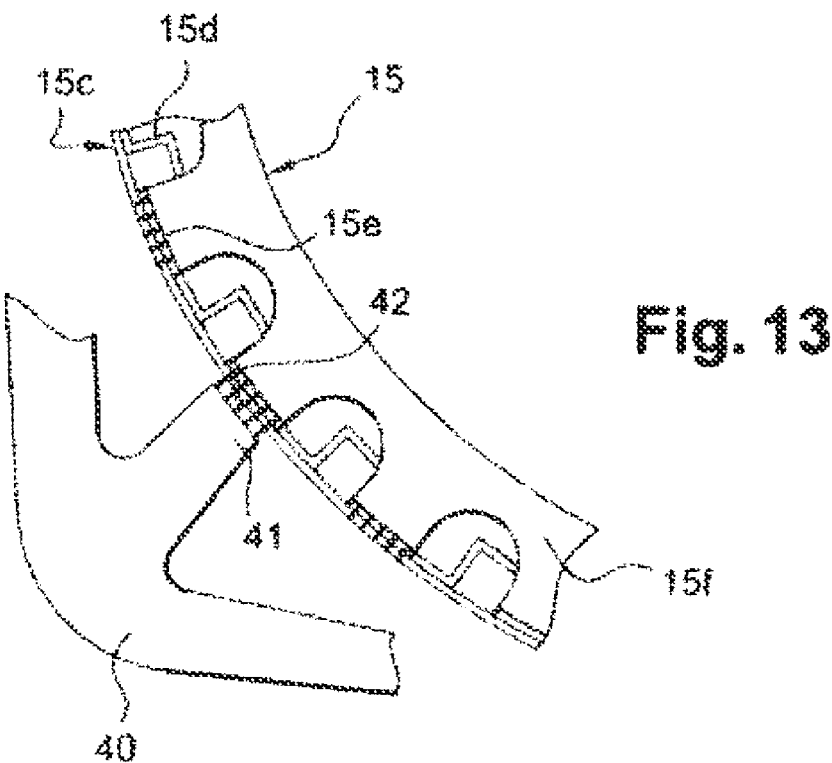
FIGS. 13 and 14 show examples of attachment of a working fairing to the fuselage of an aircraft.

To be working, the ventral fairing 20 in the disclosed embodiments is attached to the fuselage 15 of the aircraft by means of structural elements, also called connecting elements. Note that, in the case of a traditional ventral fairing, the covering of the fairing is not attached mechanically to the covering of the fuselage, since no force can pass into the fairing. In the disclosed embodiments, on the contrary, the covering of the fairing is mechanically attached to the covering of the fuselage, as shown in FIGS. 13 and 14.

Figure 12:
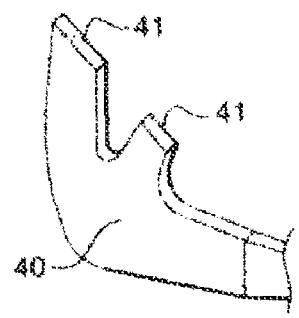
FIG. 12 shows an example of a connecting element for the aircraft section in the disclosed embodiment.

The connecting elements of the ventral fairing on the fuselage can be molded aluminum frames. They can be C-shaped or Z-shaped sections. FIG. 12 is a schematic view of an example of a connecting element. This connecting element 40 has a C-shaped section. It has feet 41, whose ends, shown in hatching in FIG. 12, are designed to be in contact with the skin of the fuselage. It is understood, of course, that several connecting elements 40 are necessary to attach the ventral fairing to the fuselage. All of these connecting elements 40 constitute part of the substructure of the working ventral fairing. The covering or envelope of the fairing is attached in the traditional way to the connecting elements 40. It can be attached, for example, in the same way as the joining of two traditional fuselage panels for the longitudinal junctions of the fuselage (junction by covering).

These connecting elements 40 are attached by riveting or bolting to the frame of the fuselage. The skin of the fuselage is thus placed between the feet 41 of the connecting elements of the fairing and the feet of the frame of the fuselage. FIG. 13 shows an example of a connecting element 40 mounted on the fuselage 15. This FIG. 13 shows longitudinal stiffeners 15d of the fuselage, a frame 15f of the fuselage, the skin 15c of the fuselage, fasteners 15e to attach the skin 15c to the frame 15f and fasteners 42 to attach the connecting elements 40 of the ventral fairing to the frame 15f. One can see that the connecting element 40 is attached to the fuselage 15 by the feet 41 of said connecting element, imprisoning the skin 15c of the fuselage between the frame 15f of the fuselage and the feet 41 of the connecting elements.

Figure 14:
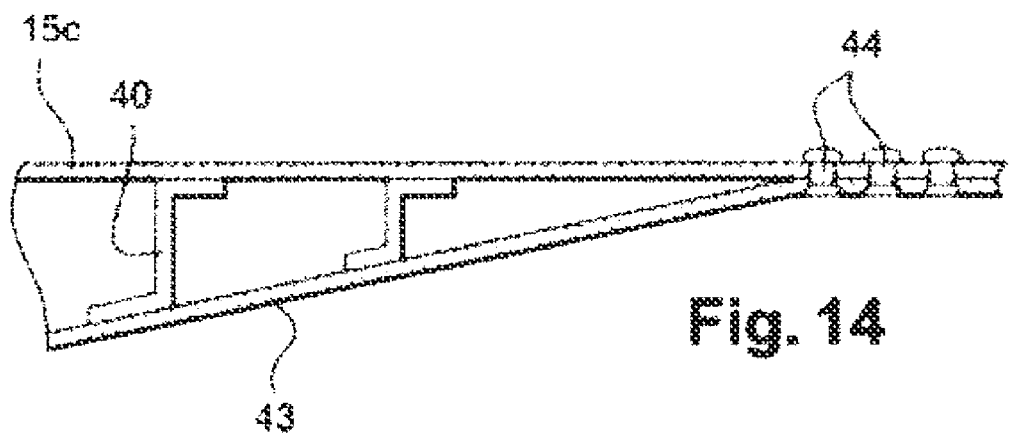

FIG. 14 shows schematically a cross section of part of a center section, showing the joining of the fuselage panels with the ventral fairing in the disclosed embodiments. This FIG. 14 shows the positioning and the attachment of the ventral fairing to the fuselage. In particular, it shows the working ventral fairing with its connecting elements 40 or frame forming in part the substructure, and the covering 43 covering the substructure to ensure the aerodynamic continuity of the fuselage. This figure also shows the skin 15c of the fuselage and some fasteners 44 that maintain the fairing on the fuselage in the area where the fuselage and the fairing are joined.

The invention claimed is:

1. The center section of an aircraft comprising:
   a center part of an aircraft fuselage
   a wing section
   a center wing box installed at least partly in the fuselage and joining the wing section and the fuselage,
   and
   a ventral fairing partly enveloping the fuselage and the wing section wherein the ventral fairing is attached directly to the stiffeners of the wing section and to the frame of the fuselage by means of structural elements that can make said ventral fairing working.

2. The center section of the aircraft in claim 1, wherein the structural elements constitute, at least in part, a substructure of the ventral fairing, with this substructure covered with an envelope.

3. The center section of the aircraft in claim 1, wherein the structural elements include fastening elements to attach the wing section mechanically to the fuselage, thus allowing at least some of the flexing forces to be transferred from the wing section to the fuselage.

4. The center section of the aircraft in claims 1, wherein the structural elements include connecting elements to attach the ventral fairing mechanically to the fuselage, thus providing an at least partial transfer of the flexing forces from the rear boat of the fuselage to the front boat.

5. The center section of the aircraft in claim 3, wherein the fastening elements are fish-plates attached, on the other hand, to stiffeners in the wing section and, on the other hand, to feet on the frame of the fuselage.

6. The center section of the aircraft in claim 4, wherein the connecting elements are C-shaped frames attached to the frame of the fuselage.

7. The center section of the aircraft in claim 6, wherein the connecting elements are attached to the frame of the fuselage by riveting or bolting.

8. The center section of the aircraft in claim 1, wherein the structural elements are made of composite materials.

9. The center section of the aircraft in claim 1, wherein the structural elements are made of titanium.

10. An aircraft that has the center fuselage section in claim 1.

* * * * *

UNITED STATES PATENT AND TRADEMARK OFFICE
CERTIFICATE OF CORRECTION

| | | |
|---|---|---|
| PATENT NO. | : 8,177,167 B2 | |
| APPLICATION NO. | : 12/569209 | |
| DATED | : May 15, 2012 | |
| INVENTOR(S) | : Cedric Meyer | |

It is certified that error appears in the above-identified patent and that said Letters Patent is hereby corrected as shown below:

Column 8, line 34, Claim 4, delete "claims," and insert -- claim --, therefor.

Column 8, line 40, Claim 5, after "attached" delete ", on the other hand,", therefor.

Column 8, line 41, Claim 5, after "and" delete ", on the other hand,", therefor.

Signed and Sealed this
Tenth Day of July, 2012

David J. Kappos
*Director of the United States Patent and Trademark Office*